(12) United States Patent
Gullapudi et al.

(10) Patent No.: US 12,430,403 B2
(45) Date of Patent: Sep. 30, 2025

(54) DYNAMIC CALIBRATION OF CONFIDENCE-ACCURACY MAPPINGS IN ENTITY MATCHING MODELS

(71) Applicant: SAP SE, Walldorf (DE)

(72) Inventors: Sundeep Gullapudi, Singapore (SG); Rajesh Vellore Arumugam, Singapore (SG); Anantharaman Ravi, Singapore (SG); Prawira Putra Fadjar, Singapore (SG); Wei Xia, Singapore (SG)

(73) Assignee: SAP SE, Walldorf (DE)

( * ) Notice: Subject to any disclaimer, the term of this patent is extended or adjusted under 35 U.S.C. 154(b) by 942 days.

(21) Appl. No.: 17/646,886

(22) Filed: Jan. 4, 2022

(65) Prior Publication Data
US 2023/0214456 A1 Jul. 6, 2023

(51) Int. Cl.
*G06F 18/21* (2023.01)
(52) U.S. Cl.
CPC ................ *G06F 18/2193* (2023.01)
(58) Field of Classification Search
CPC .. G06F 18/2193; G06Q 10/04; G06Q 30/015; G06Q 30/0201; G06Q 30/04; G06Q 30/0631; G06Q 40/02; G06Q 40/12; G06Q 10/06
See application file for complete search history.

(56) References Cited

U.S. PATENT DOCUMENTS

| 10,986,020 B2 | 4/2021 | Bhattacharjee et al. |
| 2020/0193511 A1 | 6/2020 | Saito et al. |

OTHER PUBLICATIONS

U.S. Appl. No. 17/452,441, filed Oct. 27, 2021, Arumugam et al.
U.S. Appl. No. 17/455,046, filed Nov. 16, 2021, Gullapudi.

*Primary Examiner* — Pei Yong Weng
(74) *Attorney, Agent, or Firm* — Fish & Richardson P.C.

(57) ABSTRACT

Methods, systems, and computer-readable storage media for receiving a first set of predictions generated by a ML model during execution of a training pipeline to train the ML model, each prediction in the first set of predictions being associated with a confidence, determining a set of confidence bins based on confidences of the first set of predictions, for each confidence bin in the set of confidence bins, providing an accuracy, processing the set of confidence bins and accuracies through a regression model to provide one or more regressions, each regression representing a confidence-to-accuracy relationship, defining a set of confidence thresholds based on at least one regression of the one or more regressions, and during an inference phase, applying the set of confidence thresholds to selectively filter predictions from a second set of predictions generated by the ML model.

20 Claims, 8 Drawing Sheets

DYNAMIC CALIBRATION OF CONFIDENCE-ACCURACY MAPPINGS IN ENTITY MATCHING MODELS

BACKGROUND

Enterprises continuously seek to improve and gain efficiencies in their operations. To this end, enterprises employ software systems to support execution of operations. Recently, enterprises have embarked on the journey of so-called intelligent enterprise, which includes automating tasks executed in support of enterprise operations using machine learning (ML) systems. For example, one or more ML models are each trained to perform some task based on training data. Trained ML models are deployed, each receiving input (e.g., a computer-readable document) and providing output (e.g., classification of the computer-readable document) in execution of a task (e.g., document classification task). ML systems can be used in a variety of problem spaces. An example problem space includes autonomous systems that are tasked with matching items of one entity to items of another entity. Examples include, without limitation, matching questions to answers, people to products, bank statements to invoices, and bank statements to customer accounts.

One or more tasks can be executed based on predictions provided from an ML model. In some cases, a task is automatically executed in response to a prediction provided by the ML model. Before executing a task, a confidence of a prediction can be compared to a threshold confidence to determine whether the prediction is sufficient in order that a task should be executed in response thereto. Accordingly, confidence thresholds can be configured that should be achieved in the predictions in an effort to maximize accurate predictions. In some approaches, configuring confidence thresholds is based on determining an accuracy of confidence values. However, multiple confidence values can have the same or similar accuracies. In a non-limiting example, a target accuracy for predictions can be selected as 97%, but that target accuracy is achieved for both 10% confidence and 100% confidence for a particular ML model. This can result in predictions with proposals of as low as 10% confidence being deemed acceptable even though there is a high likelihood that such predictions are incorrect.

SUMMARY

Implementations of the present disclosure are directed to a machine learning (ML) system that provides and enables selection of confidence thresholds to be applied during inference. More particularly, implementations of the present disclosure are directed to a ML system that provides confidence-to-accuracy relationships from a training pipeline for selection of confidence thresholds to be applied during inference.

In some implementations, actions include receiving a first set of predictions generated by a ML model during execution of a training pipeline to train the ML model, each prediction in the first set of predictions being associated with a confidence, determining a set of confidence bins based on confidences of the first set of predictions, for each confidence bin in the set of confidence bins, providing an accuracy, processing the set of confidence bins and accuracies through a regression model to provide one or more regressions, each regression representing a confidence-to-accuracy relationship, defining a set of confidence thresholds based on at least one regression of the one or more regressions, and during an inference phase, applying the set of confidence thresholds to selectively filter predictions from a second set of predictions generated by the ML model. Other implementations of this aspect include corresponding systems, apparatus, and computer programs, configured to perform the actions of the methods, encoded on computer storage devices.

These and other implementations can each optionally include one or more of the following features: the regression model includes one of a polynomial regression model and an isotonic regression model; each accuracy is determined as a ratio of a number of correct predictions within a confidence bin and a total number of predictions within the confidence bin; determining a set of confidence bins includes selecting a confidence step based on a distribution of the confidences, wherein each confidence bin includes a confidence and the confidence step; the set of confidence thresholds includes a first sub-set of confidence thresholds associated with single match and a second sub-set of confidence thresholds associated with multi-match; the first sub-set of confidence thresholds includes a first proposal threshold and a first auto-task threshold, and the second sub-set of includes a second proposal threshold and a second auto-task threshold; and actions further include automatically executing at least one task in response to a prediction in the second set of predictions.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
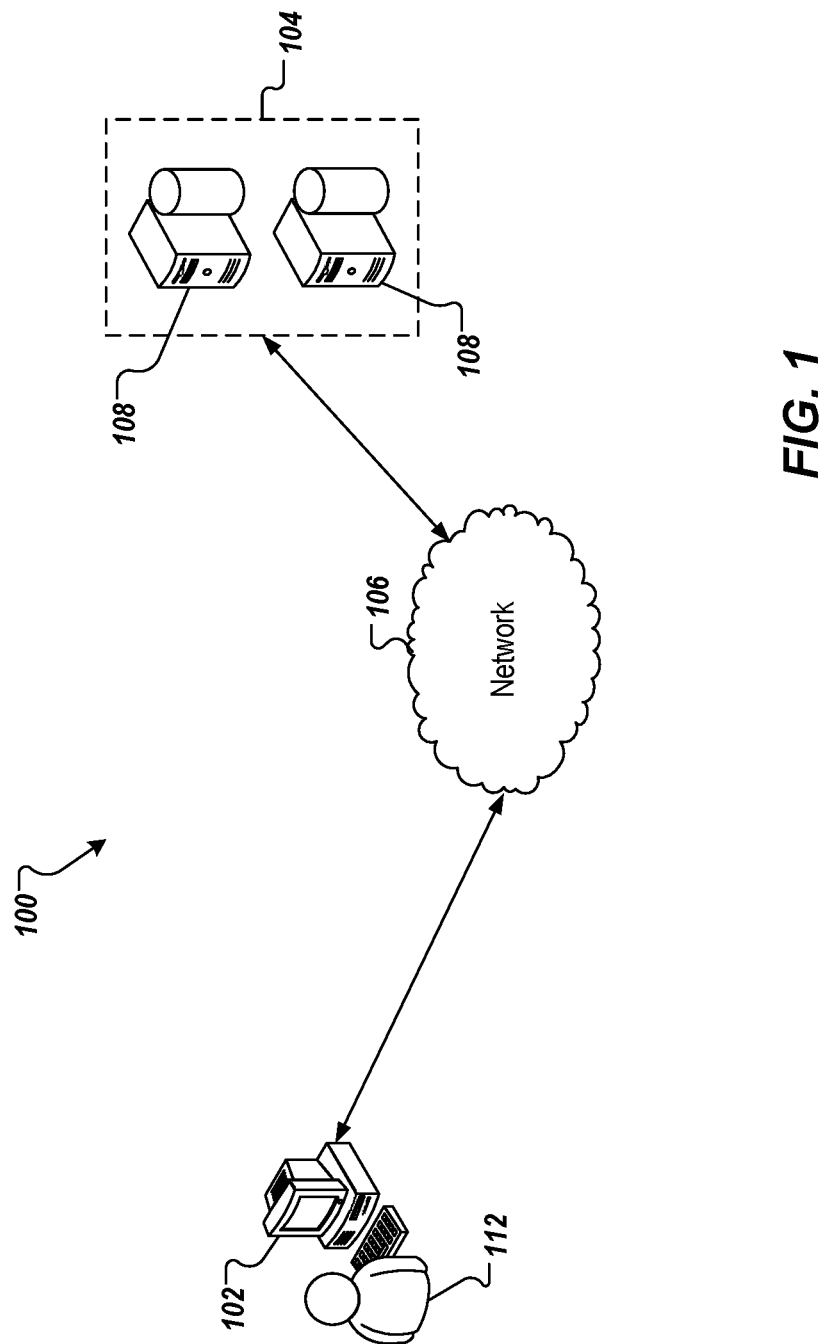
FIG. 1 depicts an example architecture that can be used to execute implementations of the present disclosure.

Implementations of the present disclosure are directed to a machine learning (ML) system that provides and enables selection of confidence thresholds to be applied during inference. More particularly, implementations of the present disclosure are directed to a ML system that provides confidence-to-accuracy relationships from a training pipeline for selection of confidence thresholds to be applied during inference.

Implementations can include actions of receiving a first set of predictions generated by a ML model during execution of a training pipeline to train the ML model, each prediction in the first set of predictions being associated with a confidence, determining a set of confidence bins based on confidences of the first set of predictions, for each confidence bin in the set of confidence bins, providing an accuracy, processing the set of confidence bins and accuracies through a regression model to provide one or more regressions, each regression representing a confidence-to-accuracy relationship, defining a set of confidence thresholds based on at least one regression of the one or more regressions, and during an inference phase, applying the set of confidence thresholds to selectively filter predictions from a second set of predictions generated by the ML model.

Implementations of the present disclosure are described in further detail with reference to an example problem space that includes the domain of finance and matching bank statements to invoices. More particularly, implementations of the present disclosure are described with reference to the problem of, given a bank statement (e.g., a computer-readable electronic document recording data representative of a bank statement), enabling an autonomous system using a ML model to determine one or more invoices (e.g., computer-readable electronic documents recording data representative of one or more invoices) that are represented in the bank statement. It is contemplated, however, that implementations of the present disclosure can be realized in any appropriate problem space.

Implementations of the present disclosure are also described in further detail herein with reference to an example application that leverages one or more ML models to provide functionality (referred to herein as a ML application). The example application includes SAP Cash Application (CashApp) provided by SAP SE of Walldorf, Germany. CashApp leverages ML models that are trained using a ML framework (e.g., SAP Leonardo Machine Learning) to learn accounting activities and to capture rich detail of customer and country-specific behavior. An example accounting activity can include matching payments indicated in a bank statement to invoices for clearing of the invoices. For example, using an enterprise platform (e.g., SAP S/4 HANA), incoming payment information (e.g., recorded in computer-readable bank statements) and open invoice information are passed to a matching engine, and, during inference, one or more ML models predict matches between records of a bank statement and invoices. In some examples, matched invoices are either automatically cleared (auto-clearing) or suggested for review by a user (e.g., accounts receivable). Although CashApp is referred to herein for purposes of illustrating implementations of the present disclosure, it is contemplated that implementations of the present disclosure can be realized with any appropriate application that leverages one or more ML models.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host an autonomous system that uses a ML model to match entities. That is, the server system 104 can receive computer-readable electronic documents (e.g., bank statement, invoice table), and can match entities within the electronic document (e.g., a bank statement) to one or more entities in another electronic document (e.g., invoice table). In some examples, the server system 104 includes a ML platform that provides and trains a ML model, as described herein.

Figure 2:
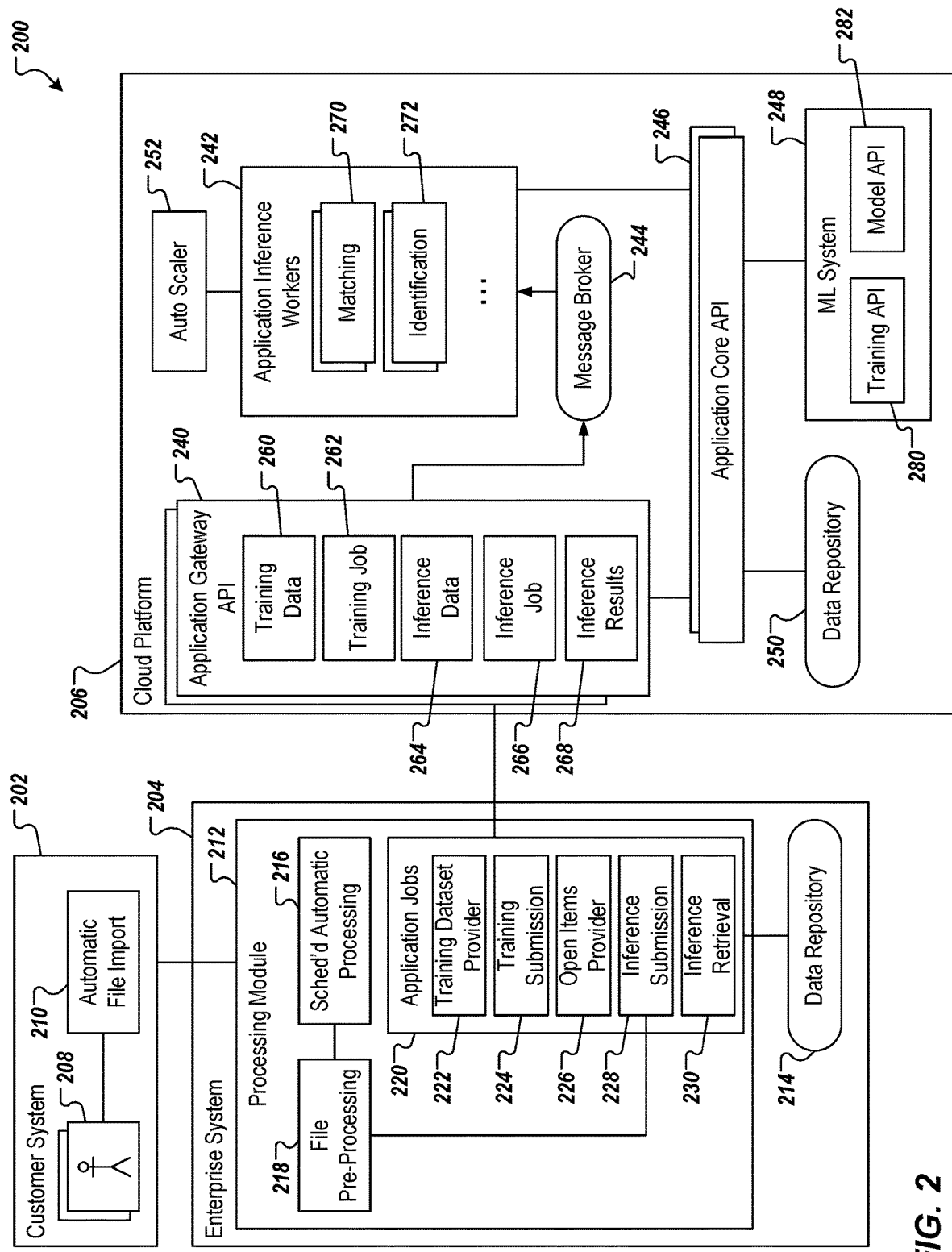
FIG. 2 depicts an example conceptual architecture in accordance with implementations of the present disclosure.

FIG. 2 depicts an example conceptual architecture 200 in accordance with implementations of the present disclosure. In the depicted example, the conceptual architecture 200 includes a customer system 202, an enterprise platform 204 (e.g., SAP S/4 HANA) and a cloud platform 206 (e.g., SAP Cloud Platform (Cloud Foundry)). As described in further detail herein, the enterprise platform 204 and the cloud platform 206 facilitate one or more ML applications that leverage ML models to provide functionality for one or more enterprises. In some examples, each enterprise interacts with the ML application(s) through a respective customer system 202. For purposes of illustration, and without limitation, the conceptual architecture 200 is discussed in further detail with reference to CashApp, introduced above. However, implementations of the present disclosure can be realized with any appropriate ML application.

In the example of FIG. 2, the customer system 202 includes one or more client devices 208 and a file import module 210. In some examples, a user (e.g., an employee of the customer) interacts with a client device 208 to import one or more data files to the enterprise platform 204 for processing by a ML application. For example, and in the context of CashApp, an invoice data file and a bank statement data file can be imported to the enterprise platform 204 from the customer system 202. In some examples, the invoice data file includes data representative of one or more invoices issued by the customer, and the bank statement data file includes data representative of one or more payments received by the customer. As another example, the one or more data files can include training data files that provide customer-specific training data for training of one or more ML models for the customer.

In the example of FIG. 2, the enterprise platform 204 includes a processing module 212 and a data repository 214. In the context of CashApp, the processing module 212 can include a finance—accounts receivable module. The processing module 212 includes a scheduled automatic processing module 216, a file pre-processing module 218, and an applications job module 220. In some examples, the scheduled automatic processing module 216 receives data files from the customer system 202 and schedules the data files for processing in one or more application jobs. The data files are pre-processed by the file pre-processing module 218 for consumption by the processing module 212.

Example application jobs can include, without limitation, training jobs and inference jobs. In some examples, a training job includes training of a ML model using a training file (e.g., that records customer-specific training data). In some examples, an inference job includes using a ML model to provide a prediction, also referred to herein as an inference result. In the context of CashApp, the training data can include invoice to bank statement matches as examples provided by a customer, which training data is used to train a ML model to predict invoice to bank statement matches. Also in the context of CashApp, the data files can include an invoice data file and a bank statement data file that are ingested by a ML model to predict matches between invoices and bank statements in an inference process.

With continued reference to FIG. 2, the application jobs module 220 includes a training dataset provider sub-module 222, a training submission sub-module 224, an open items provider sub-module 226, an inference submission sub-module 228, and an inference retrieval sub-module 230. In some examples, for a training job, the training dataset provider sub-module 222 and the training submission sub-module 224 function to request a training job from and provide training data to the cloud platform 206. In some examples, for an inference job, the training dataset provider sub-module 222 and the training submission sub-module 224 function to request a training job from and provide training data to the cloud platform 206.

In some implementations, the cloud platform 206 hosts at least a portion of the ML application (e.g., CashApp) to execute one or more jobs (e.g., training job, inference job). In the example of FIG. 2, the cloud platform 206 includes one or more application gateway application programming interfaces (APIs) 240, application inference workers 242 (e.g., matching worker 270, identification worker 272), a message broker 244, one or more application core APIs 246, a ML system 248, a data repository 250, and an auto-scaler 252. In some examples, the application gateway API 240 receives job requests from and provides job results to the enterprise system 204 (e.g., over a REST/HTTP [oAuth] connection). For example, the application gateway API 240 can receive training data 260 for a training job 262 that is executed by the ML system 248. As another example, the application gateway API 240 can receive inference data 264 (e.g., invoice data, bank statement data) for an inference job 266 that is executed by the application inference workers 242, which provide inference results 268 (e.g., predictions).

In some examples, the enterprise system 204 can request the training job 262 to train one or more ML models using the training data 262. In response, the application gateway API 240 sends a training request to the ML system 248 through the application core API 246. By way of non-limiting example, the ML system 248 can be provided as SAP Leonardo Machine Learning. In the depicted example, the ML system 248 includes a training API 280 and a model API 282. The ML system 248 trains a ML model using the training data. In some examples, the ML model is accessible for inference jobs through the model API 282.

In some examples, the enterprise system 204 can request the inference job 266 to provide the inference results 268, which includes a set of predictions from one or more ML models. In some examples, the application gateway API 240 sends an inference request, including the inference data 264, to the application inference workers 242 through the message broker 244. An appropriate inference worker of the application inference workers 242 handles the inference request. In the example context of matching invoices to bank statements, the matching worker 270 transmits an inference request to the ML system 248 through the application core API 246. The ML system 248 accesses the appropriate ML model (e.g., the ML model that is specific to the customer and that is used for matching invoices to bank statements), which generates the set of predictions. The set of predictions are provided back to the inference worker (e.g., the matching worker 270) and are provided back to the enterprise system 204 through the application gateway API 240 as the inference results 266. In some examples, the auto-scaler 252 functions to scale the inference workers up/down depending on the number of inference jobs submitted to the cloud platform 206.

To provide further context for implementations of the present disclosure, and as introduced above, the problem of matching entities represented by computer-readable records (electronic documents) appears in many contexts. Example contexts can include matching product catalogs, deduplicating a materials database, and matching incoming payments from a bank statement table to open invoices, the example context introduced above.

Figure 3:
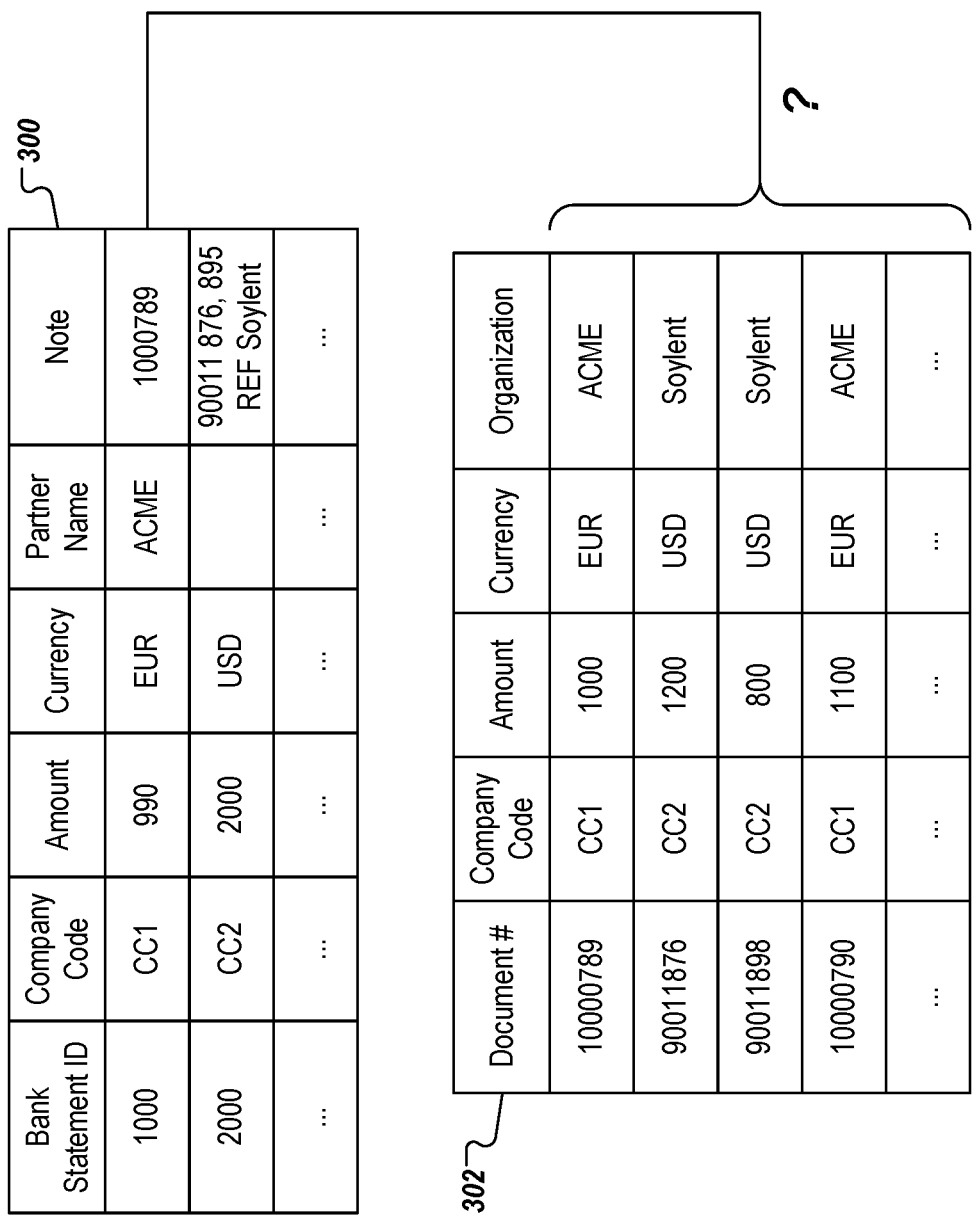
FIG. 3 depicts portions of example electronic documents.

In the example context, FIG. 3 depicts portions of example electronic documents. In the example of FIG. 3, a first electronic document 300 includes a bank statement table that includes records representing payments received, and a second electronic document 302 includes an invoice table that includes invoice records respectively representing invoices that had been issued. In the example context, each bank statement record is to be matched to one or more invoice records. Accordingly, the first electronic document 300 and the second electronic document 302 are processed using one or more ML models that provide predictions regarding matches between a bank statement record (entity) and one or more invoice records (entity/-ies) (e.g., using CashApp, as described above).

To achieve this, a ML model is provided as a classifier that is trained to predict entity pairs to a fixed set of class labels ($\vec{l}$) (e.g., $l_0$, $l_1$, $l_2$). For example, the set of class labels ($\vec{l}$) can include 'no match' ($l_0$), 'single match' ($l_1$), and 'multi match' ($l_2$). In some examples, the ML model is provided as a function $f$ that maps a query table ($\vec{d}$) and a target table ($\vec{b}$) into a vector of probabilities ($\vec{p}$) (also called 'confidences' in the deep learning context) for the labels in the set of class labels. This can be represented as:

$$f(\vec{a}, \vec{b}) = \begin{pmatrix} p_0 \\ p_1 \\ p_2 \end{pmatrix}$$

where $\vec{p} = \{p_0, p_1, p_2\}$. In some examples, $p_0$ is a prediction probability (also referred to herein as confidence c) of the entity pair $\vec{a}$, $\vec{b}$ belonging to a first class (e.g., no match), $p_1$ is a prediction probability of the entity pair $\vec{a}$, $\vec{b}$ belonging to a second class (e.g., single match), and $p_2$ is a prediction probability of the entity pair $\vec{a}$, $\vec{b}$ belonging to a third class (e.g., multi match).

Here, $p_0$, $p_1$, and $p_2$ can be provided as numerical values indicating a likelihood (confidence) that the entity pair $\vec{a}$, $\vec{b}$ belongs to a respective class. In some examples, the ML model can assign a class to the entity pair $\vec{a}$, $\vec{b}$ based on the values of $p_0$, $p_1$, and $p_2$. In some examples, the ML model can assign the class corresponding to the highest value of $p_0$, $p_1$, and $p_2$. For example, for an entity pair $\vec{a}$, $\vec{b}$, the ML model can provide that $p_0 = 0.13$, $p_1 = 0.98$, and $p_2 = 0.07$. Consequently, the ML model can assign the class 'single match' ($l_1$) to the entity pair $\vec{a}$, $\vec{b}$.

In further detail, a training pipeline for training a ML model includes multiple phases. Example phases include training the ML model, validating the ML model, and testing the ML model. Example phases include a training phase, a validation phase, and a testing phase. In some examples, training data is provided and includes known inputs and known outputs. In some examples, the training data is divided into sub-sets, each sub-set being used for a respective phase of the training pipeline. For example, the training data can be divided into a training sub-set, a validation sub-set, and a testing sub-set.

In the training phase, the ML model is trained on training data in the training sub-set. The ML model is iteratively trained, where, during an iteration, also referred to as epoch, one or more parameters of the ML model are adjusted, and an output is generated based on the training data (e.g., class predictions). For each iteration, a loss value is determined based on a loss function. The loss value represents a degree of accuracy of the output of the ML model. The loss value can be described as a representation of a degree of difference between the output of the ML model and an expected output of the ML model (the expected output being provided from training data). In some examples, if the loss value does not meet an expected value (e.g., is not equal to zero), parameters of the ML model are adjusted in another iteration (epoch) of training. In some examples, the iterative training continues for a pre-defined number of iterations (epochs). In some examples, the iterative training continues until the loss value meets the expected value or is within a threshold range of the expected value.

In the validation phase, the (trained) ML model is evaluated using the validation sub-set. For example, the known inputs can be processed through the ML model to generate respective predictions, and the predictions can be compared to the respective known outputs of the validation sub-set to validate the ML model. In general, the validation phase provides an unbiased evaluation of a fit of the ML model on the training sub-set. In some examples, one or more hyper-parameters (e.g., high-level hyperparameters) of the ML model can be adjusted during the validation phase.

In the testing phase, the (trained and validated) ML model is tested based on the test sub-set and an accuracy of the ML model can be determined. For example, the known inputs can be processed through the ML model to generate respective predictions, and the predictions can be compared to the respective known outputs of the test sub-set to test the ML model. An accuracy of the ML model can be provided by comparing the number of correct predictions to the total number of predictions performed during the testing phase.

Enterprises submitting inference jobs request accuracies of the predicted matches. In this manner, an enterprise can configure confidence thresholds that should be achieved in the predicted matches in an effort to maximize accurate predictions. Prediction accuracy has significant implications in downstream tasks that are selectively executed based on the predictions. For example, and in the non-limiting context of finance-related applications, an invoice is automatically cleared, if the invoice record is matched to a bank statement record with a confidence that meets or exceeds a confidence threshold. Selection of a confidence threshold, however, is based on accuracy values. That is, a confidence threshold should be selected that is associated with a sufficient accuracy.

In a traditional approach, accuracy values are calculated for every unique confidence (i.e., probability output by a ML model) in the validation sub-set during the training pipeline. The accuracy is calculated by considering all of the correctly predicted values above or equal to that confidence value divided by the total number of predictions above or equal to that confidence value. For example, given a confidence c (also referred to as probability p) which is a ML model prediction probability value with range [0, 1], its accuracy (A) is defined as follows:

$$A = \frac{N_{corr,c}}{N_{tot,c}}$$

where $N_{corr,c}$ is the number of correct predictions having a confidence equal to or above c, and $N_{tot,c}$ is the total number of predictions having a confidence equal to or above c.

Table 1, below, represents an example portion of confidence to accuracy value mapping based on the traditional approach:

TABLE 1

Example Portion of Confidence-to-Accuracy Distribution using the Traditional Approach

| Confidence | Accuracy |
|---|---|
| 0.00000 | 0.916709 |
| 0.00001 | 0.916941 |
| 0.00002 | 0.917368 |
| 0.00003 | 0.917717 |
| 0.00004 | 0.917873 |
| 0.00005 | 0.917911 |
| 0.00006 | 0.918183 |
| 0.00007 | 0.918572 |
| 0.00008 | 0.918883 |

TABLE 1-continued

Example Portion of Confidence-to-Accuracy
Distribution using the Traditional Approach

| Confidence | Accuracy |
|---|---|
| 0.00009 | 0.919078 |
| 0.00010 | 0.919156 |
| 0.00011 | 0.919234 |
| 0.00012 | 0.919390 |
| 0.00013 | 0.919429 |
| 0.00014 | 0.919507 |
| 0.00015 | 0.919585 |
| 0.00016 | 0.919741 |
| 0.00017 | 0.919819 |
| 0.00018 | 0.919975 |
| 0.00019 | 0.920170 |
| 0.00020 | 0.920482 |
| 0.00021 | 0.920560 |
| 0.00022 | 0.920716 |
| 0.00023 | 0.920795 |
| 0.00024 | 0.920834 |
| 0.00025 | 0.920912 |
| 0.00026 | 0.921186 |
| 0.00027 | 0.921460 |
| 0.00028 | 0.921538 |
| 0.00029 | 0.921616 |
| 0.00030 | 0.921694 |
| 0.00031 | 0.921890 |
| 0.00032 | 0.921929 |
| 0.00033 | 0.922086 |
| 0.00034 | 0.922282 |
| 0.00035 | 0.922478 |
| 0.00036 | 0.922635 |
| 0.00037 | 0.922710 |
| 0.00038 | 0.922789 |
| 0.00039 | 0.923025 |
| 0.00040 | 0.923061 |
| 0.00041 | 0.923178 |
| 0.00042 | 0.923218 |
| 0.00043 | 0.923375 |
| 0.00044 | 0.923493 |
| 0.00045 | 0.923611 |
| 0.00046 | 0.923807 |
| 0.00047 | 0.923847 |
| 0.00048 | 0.923965 |
| 0.00049 | 0.924122 |

However, the traditional approach has deficiencies. For example, using the traditional approach, if there is a higher accuracy at higher confidence values, the same is propagated to the lower confidence values. That is, low confidence values can be mapped to relatively high accuracies. For example, a target accuracy for predictions can be selected as 97%. However, a 10% confidence and a 100% confidence can each be achieved with 97% accuracy. This can result in predictions with proposals of as low as 10% confidence being proposed and, in some cases, result in some task(s) being automatically be performed (e.g., invoice clearance). However, there is a high likelihood that such predictions are incorrect.

In traditional approaches, selecting an ideal confidence value as a confidence threshold might not be possible. For example, there can be many confidence values with the same accuracy, and there is no general rule to determine which is appropriate to select as a confidence threshold. As another example, enterprises do not have direct control over selection of confidence values as confidence thresholds. This creates a problem for enterprises to identify the best confidence threshold to enable automated tasks to be triggered, for example. To illustrate these issues, the following example can be considered:

TABLE 2

Example Inference Results in Validation and/or Test Phases

| Index | BS | IV | Confidence | Correct? |
|---|---|---|---|---|
| 1 | BS1 | IV5 | 0.6 | 1 |
| 2 | BS2 | IV3, IV4 | 0.5 | 1 |
| 3 | BS3 | IV1, IV6 | 0.7 | 1 |
| 4 | BS4 | IV2 | 0.3 | 0 |
| 5 | BS5 | IV7, IV8 | 0.7 | 1 |
| 6 | BS6 | IV9 | 0.5 | 1 |
| ... | ... | ... | ... | ... | where BS represents a bank statement record and IV represents an invoice.

In the example of Table 2, a correct prediction is indicated as 1 and an incorrect prediction is indicated as 0. In this example, the following set of confidences (probabilities) is provided [0.3, 0.5, 0.5, 0.6, 0.7, 0.7], and the following set of unique confidence values is provided [0.3, 0.5, 0.6, 0.7]. An accuracy for each confidence value can be determined as follows:

$$A_{0.3}=5/6=0.83$$

$$A_{0.5}=5/5=1$$

$$A_{0.6}=3/3=1$$

$$A_{0.7}=2/2=1$$

In this example, the same accuracy (i.e., 1 or 100%) can be achieved for each of confidence values 0.5, 0.6, 0.7. Consequently, identifying a confidence value to serve as a confidence threshold is impractical.

In view of the above context, implementations of the present disclosure are directed to a ML system that provides and enables selection of confidence thresholds to be applied during inference. More particularly, implementations of the present disclosure are directed to a ML system that provides confidence-to-accuracy relationships from a training pipeline for selection of confidence thresholds to be applied during inference.

As described in further detail herein, implementations of the present disclosure determine a target accuracy for a range (also referred to as bin) of confidence values and use this to generalize the target accuracy to confidence into a continuous equation (e.g., regression). In accordance with implementations of the present disclosure, a bin is defined for each confidence value based on a confidence step, which defines the bin size. For example, a confidence step is provided as Y, such that, for a confidence value X, the confidence bin is X+Y. In some examples, Y is an increment of X (e.g., one hundredth, two hundredths). In some examples, the size of the bin (e.g., the confidence step) is determined based on a distribution of the confidence values. For example, for a dense distribution, the bin size is relatively small (e.g., confidence step of one hundredth), and for a sparse distribution, the bin size is relatively larger bin size is relatively large (e.g., two hundredths). In some examples, the confidence step can be determined using the Freedman-Diaconis rule, which can be described as minimizing an integral of the squared difference between the relative frequency density (histogram) and the density of the theoretical probability distribution. In some examples, the confidence step is constant (e.g., 0.001).

To illustrate implementations of the present disclosure, the following non-limiting example is provided. In this example, a target accuracy is to be determined for a confidence value of 0.2 (i.e., X=0.2) and a confidence step of 0.02 (i.e., Y=0.02). Here, the accuracy is calculated as:

$$A_{0.2-0.22} = \frac{N_{corr,0.2-0.22}}{N_{tot,0.2-0.22}}$$

where $N_{corr,0.2-0.22}$ is the number of correct predictions within a confidence range of [0.2, 0.22] inclusive, and $N_{tot,0.2-0.22}$ is the total number of predictions within a confidence range of [0.2, 0.22] inclusive. Table 3, below, illustrates non-limiting example accuracy determinations based on confidence ranges in accordance with implementations of the present disclosure:

TABLE 3

Example Confidence Bin to Accuracy Values

| Confidence Bin | Max. | Min. | Accuracy (Single) | Accuracy (Multi) |
|---|---|---|---|---|
| [0.0, 0.01] | 0.00 | 0.01 | 0.011 | 0.429 |
| [0.01, 0.02] | 0.01 | 0.02 | 0.014 | 0.500 |
| [0.02, 0.03] | 0.02 | 0.03 | 0.037 | 0.500 |
| ... | ... | ... | ... | ... |
| [0.98, 0.99] | 0.98 | 0.99 | 0.956 | 1.000 |

Figure 4A:
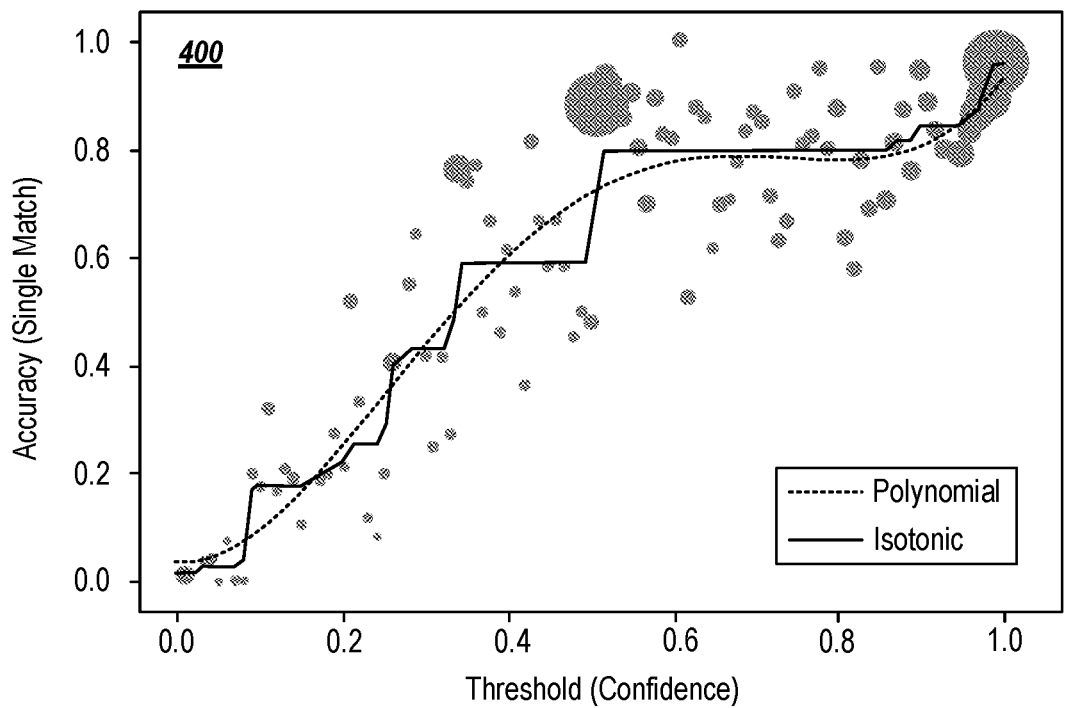
FIGS. 4A and 4B depict confidence-to-accuracy plots for single match and multi-match in accordance with implementations of the present disclosure.
Figure 4B:
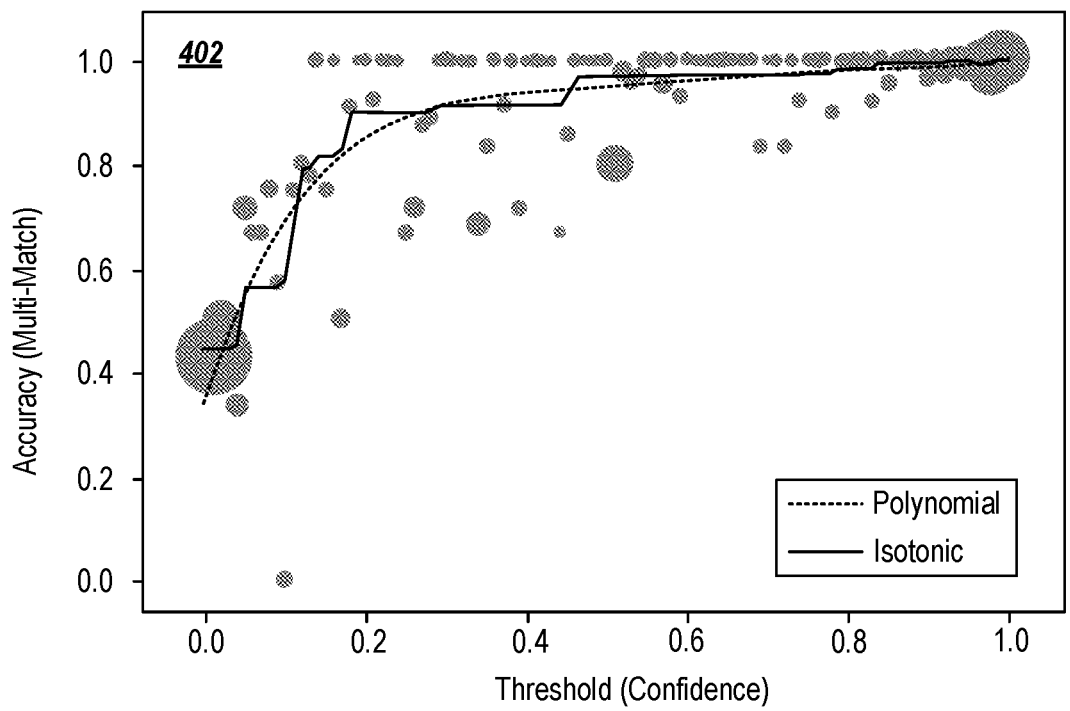

In accordance with implementations of the present disclosure, confidence can be plotted against accuracy to provide confidence-to-accuracy plots. In some implementations, the data values are processed through one or more ML models to model the relationship between confidence and accuracy of a ML model that is used to match entities. For example, FIGS. 4A and 4B depict confidence-to-accuracy plots 400, 402 for single match and multi-match in accordance with implementations of the present disclosure. To arrive at the confidence-to-accuracy plots 400, 402, two different ML models were used to process example data points of confidence bins to accuracy. In the examples of FIGS. 4A and 4B, the dashed line represents a polynomial regression with dynamic polynomial degree calculation and the solid line represents an isotonic regression with clip ranges from [0-1]. Larger bubbles represent the density of proposals, which provide a relatively higher confidence in determining a correctness of the ML model that was used to generate the example data points of confidence bins to accuracy (i.e., not the ML models used to generate the regressions). In the examples of FIGS. 4A and 4B, it can be seen that implementations of the present disclosure are able to reveal that confidence values at lower accuracy values (e.g., 0.0) are much less than confidence values at higher accuracy values (e.g., 0.97), which reflects the true accuracy of the predictions provided from the ML model.

As described in detail herein, implementations of the present disclosure provide a confidence-to-accuracy relationship for a ML model that represent true accuracies of predictions provided from the ML model. Implementations of the present disclosure enable enterprises (e.g., customers) to choose confidence thresholds for target accuracy values or to choose accuracy thresholds for target confidence values.

In some implementations, a graphical user interface (GUI) can be provided that enables a user (e.g., an agent of an enterprise) to provide settings based on a confidence-to-accuracy relationship for a ML model that is making predictions. In some examples, a set of settings is provided for each type of prediction. For example, and as discussed above, a first type of prediction can include a single match and a second type of prediction can include a multi-match. In some examples, the set of settings includes settings associated with one or more tasks. An example task can include outputting a proposal to a user for the user to determine whether to execute one or more downstream tasks. Another example task can include automatically executing one or more downstream tasks based on the proposal.

In accordance with implementations of the present disclosure, for each type of prediction and each task, the user can select a confidence threshold. In response to the user input indicating a confidence threshold selected by the user, the GUI can display in accuracy for the confidence threshold. For example, the confidence threshold selected by the user is input to the confidence-to-accuracy relationship (e.g., a regression, such as those depicted in FIGS. 4A and 4B) determined for the ML model, which outputs the accuracy corresponding to the confidence threshold. In some examples, if the user is not satisfied with the accuracy, the user can input another confidence threshold and, in response, view another accuracy displayed in the GUI.

By way of non-limiting example, and in the example context of clearing invoices that are matched to bank statement records, a GUI can display a first settings selection interface for multi-match settings and a second settings selection interface for single match settings. In some examples, settings selection interface can include a proposal confidence setting and an auto-clear confidence setting. The proposal confidence setting enables selection of a confidence threshold that is to be used to determine whether a prediction is to be proposed to a user, and the auto-clear confidence setting enables selection of a confidence threshold that is to be used to determine whether to automatically auto-clear an invoice in response to the prediction.

Continuing with this non-limiting example, and as described above, for each confidence threshold selected, a respective accuracy is displayed. For example, for a first confidence-to-accuracy relationship (first regression) is provided for the ML model for multi-match predictions and a second confidence-to-accuracy relationship (second regression) is provided for the ML model for single match predictions. In response to selection of a confidence threshold for the proposal confidence setting for multi-match, the confidence threshold is input to the first regression, which provides an accuracy as output for display in the GUI. In response to selection of a confidence threshold for the auto-clear confidence setting for multi-match, the confidence threshold is input to the first regression, which provides an accuracy as output for display in the GUI. In response to selection of a confidence threshold for the proposal confidence setting for single match, the confidence threshold is input to the second regression, which provides an accuracy as output for display in the GUI. In response to selection of a confidence threshold for the auto-clear confidence setting for single match, the confidence threshold is input to the second regression, which provides an accuracy as output for display in the GUI.

In some examples, the confidence threshold can be selected and an accuracy is provided in response to the confidence threshold. In some examples, an accuracy can be selected and a confidence threshold is provided in response to the accuracy.

Figure 5:
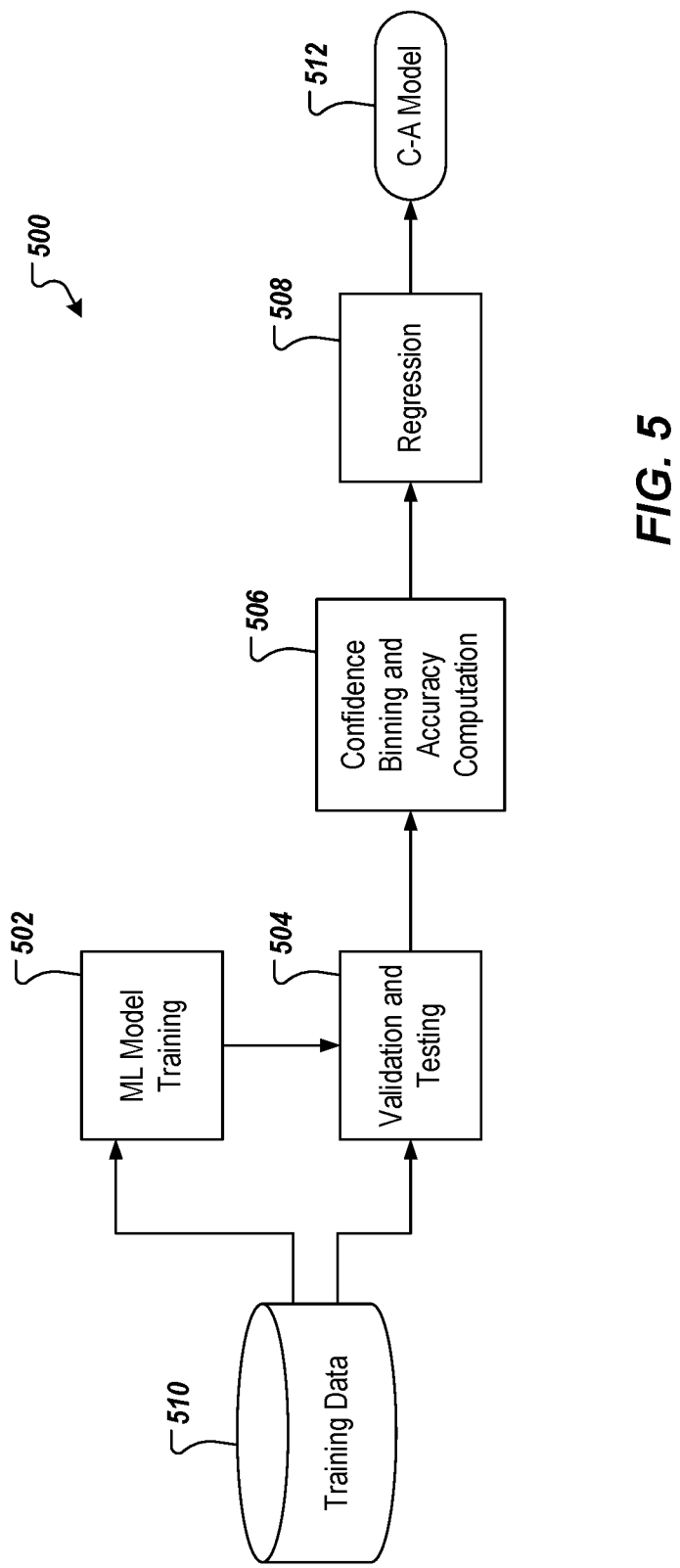
FIG. 5 depicts an example conceptual architecture for training in accordance with implementations of the present disclosure.

FIG. 5 depicts an example conceptual architecture 500 for training in accordance with implementations of the present disclosure. In the example of FIG. 5, the conceptual architecture 500 includes a ML model training module, a validation and testing module 504, a confidence binning and accuracy computation module 506, and a regression module 508. As described herein, a ML model (e.g., for providing predictions for matching entities) is trained using a portion of the training data 510. For example, a sub-set of the training data (training sub-set) is used by the ML model training module 502 to train the ML model. After training, the validation and testing module 504 validates and tests the ML model using a portion of the training data 510. For example, a sub-set of the training data (validation sub-set) is used to validate the ML model and a sub-set of the training data (testing sub-set) is used to test the ML model. As described herein, validation and/or testing of the ML model results in a set of confidence values and, for each confidence value whether the respective prediction was correct (e.g., 0 indicating incorrect, 1 indicating correct).

In some examples, the confidence binning and accuracy computation module 506 determines confidence bins and determines an accuracy for each confidence bin, as described herein. In some examples, a set of accuracies is determined for each confidence bin (e.g., multi-match accuracy, single match accuracy). In this manner, the confidence binning and accuracy computation module 506 provides a set of confidence bin to accuracy values (e.g., as depicted by way of example in Table 3). In some examples, the regression module 508 executes processes at least a portion of the set of confidence bin to accuracy values through a regression model (e.g., polynomial, isotonic) to provide one or more regressions 512. The regression 512 models a confidence-to-accuracy for the ML model. In some examples, a first regression is provided (e.g., for multi-match predictions) and a second regression is provided (e.g., for single match).

Each regression 512 is used to determine one or more confidence thresholds that can be applied during inference. For example, and as described herein, a confidence threshold can be selected through a GUI and, in response, the confidence threshold can be input to a regression 512 (i.e., confidence-to-accuracy relationship), which provides an accuracy that can be displayed in the GUI. If the accuracy is satisfactory (e.g., as decided by a user), the confidence threshold can be used during subsequent inference. If the accuracy is unsatisfactory (e.g., as decided by a user), another confidence value can be input and, in response, another accuracy can be displayed.

Figure 6:
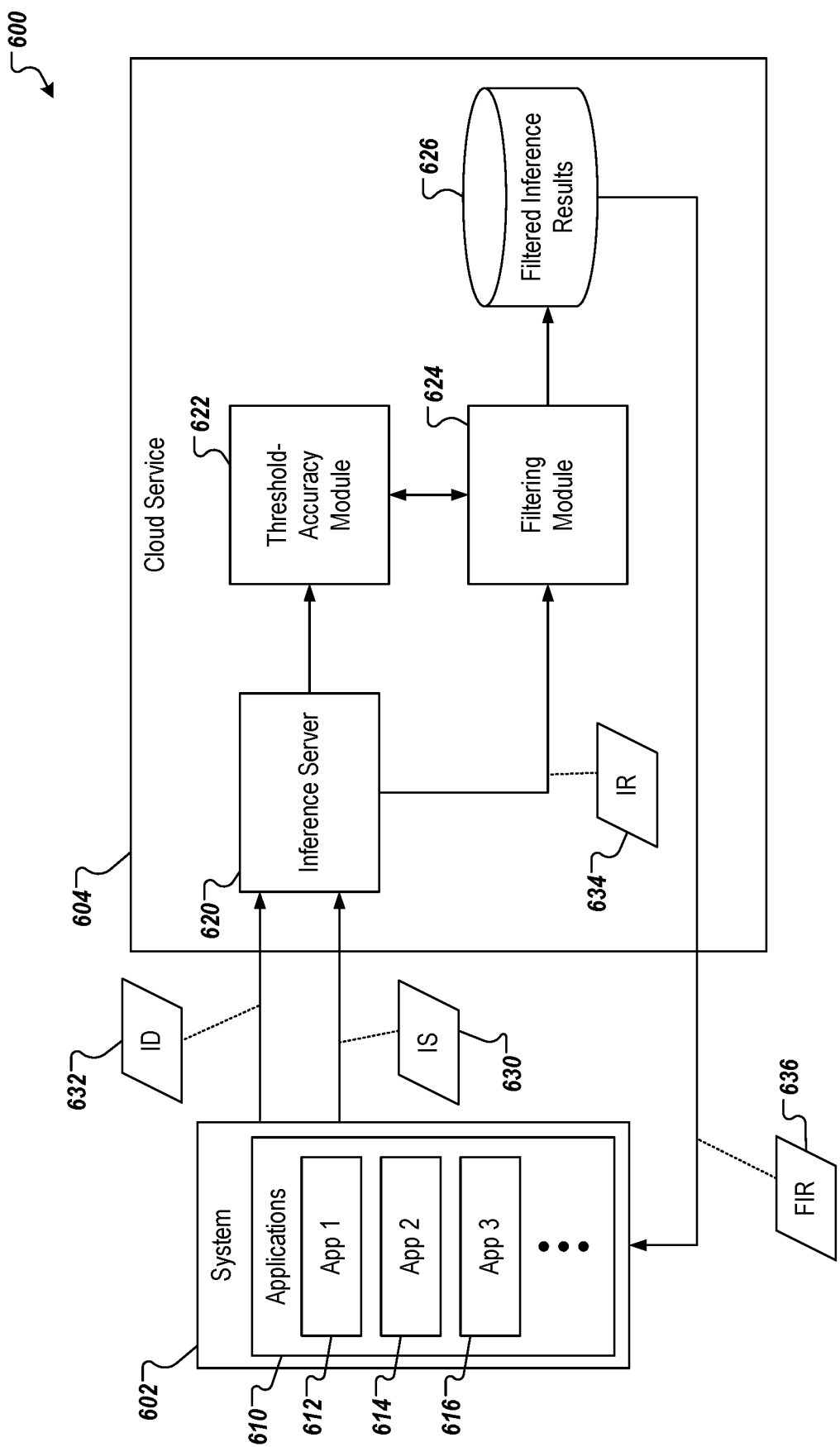
FIG. 6 depicts an example conceptual architecture for inference in accordance with implementations of the present disclosure.

FIG. 6 depicts an example conceptual architecture 600 for inference in accordance with implementations of the present disclosure. In the example of FIG. 6, the conceptual architecture 600 includes an enterprise system 602 (e.g., SAP S/4 HANA (either cloud or on premise)) and a cloud service 604. The enterprise system 602 executes a set of applications 610 including applications 612, 614, 616. In some examples, one or more of the applications 612, 614, 616 submit inference jobs to the cloud service 604 to receive inference results therefrom.

In the example of FIG. 6, the cloud service 604 is executed within a cloud platform to perform inference services. In the example of FIG. 6, the cloud service 604 includes an inference server 620, a confidence-accuracy module 622, a filtering module 624, and a filtered inference results (FIR) store 626. The inference server 620 executes a (trained) ML model to provide predictions, also referred to herein as inference results (IR). In accordance with implementations of the present disclosure, the ML model is associated with one or more confidence-to-accuracy relationships (regressions) (e.g., a regression for single match, a regression for multi-match). In some examples, prior to inference, the inference server 620 receives inference settings (IS) 630 to provide one or more confidence thresholds that are to be applied during inference, as described in detail herein.

During inference, the inference server 620 receives inference data 632 that is to be processed by the inference server 620 using the ML model to provide IR 634. For example, and in the example context discussed herein, the inference data 632 includes a bank statement document (e.g., bank statement table) and an invoice document (e.g., invoice table) and the IR 634 includes predictions of matches (e.g., multi-matches, single matches) between invoices and bank statement records. Each inference result in the IR 634 is associated with a respective confidence. The filtering module 624 receives the IR 634 and selectively filters inference results from the IR 634 to provide FIR 636, which is stored in the FIR store 626. In some examples, an inference result is filtered, if a confidence associated with the inference result is not equal to or greater than a respective confidence threshold. The FIR 636 is provided as output to the system 602 for execution of one or more tasks based thereon. For example, inference results that meet or exceed a confidence threshold for proposals, but do not meet a confidence threshold for one or more automated tasks, are provided as proposals (e.g., to a user for the user to determine whether to execute one or more tasks). As another example, inference results that meet or exceed the confidence threshold for the one or more automated tasks, result in the one or more automated tasks being automatically performed (e.g., clearing of invoices that are the subjects of the inference results).

By way of non-limiting example, and in the example context, matching of bank statement records to invoices can be conducted using the following example accuracy settings:

TABLE 4

Example Accuracy Settings

|  | Single | Multi |
|---|---|---|
| Proposal Accuracy | 80 | 70 |
| Auto-clear Accuracy | 99 | 99 |

These can be selected by a user (e.g., an agent of an enterprise) based on the following example confidence-to-accuracy relationships determined in accordance with implementations of the present disclosure:

TABLE 5

Example Confidence-to-Accuracy Relationships

| Single | | Multi | |
|---|---|---|---|
| Accuracy | Confidence | Accuracy | Confidence |
| 80 | 0.78 | 70 | 0.65 |
| ... | ... | ... | ... |
| 99 | 0.97 | 99 | 0.80 |

It can be noted that, while Table 5 depicts example confidence-to-accuracy relationships in tabular form for clarity, each relationship (regression) is provided as a continuous distribution. Example filtered inference results can be provide as:

TABLE 6

Example Filtered Inference Results

| BS | IV | Match Type | Confidence | Auto-Clear |
|----|----|-----------|-----------|-----------|
| 5  | 10 | Single | 0.81 | No |
| 6  | 15 | Single | 0.98 | Yes |
| 10 | 11 | Multi  | 0.66 | No |
| 10 | 13 | Multi  | 0.75 | No |
| ... | ... | ... | ... | ... |

In the example of Table 6, a bank statement (BS) record with identifier 5 is predicted as a single match to an invoice (IV) with identifier 10 has been predicted with a confidence of 0.81. This has been proposed because the predicted confidence (i.e., 081) is above the single match proposal confidence threshold of 0.78 for accuracy of 80 (see Tables 4 and 5). Similarly, the BS record with identifier 15 is flagged for auto-clear, because the predicted confidence of 0.98 is above the confidence threshold of 0.97 for the accuracy of 99% (see Tables 4 and 5).

Figure 7:
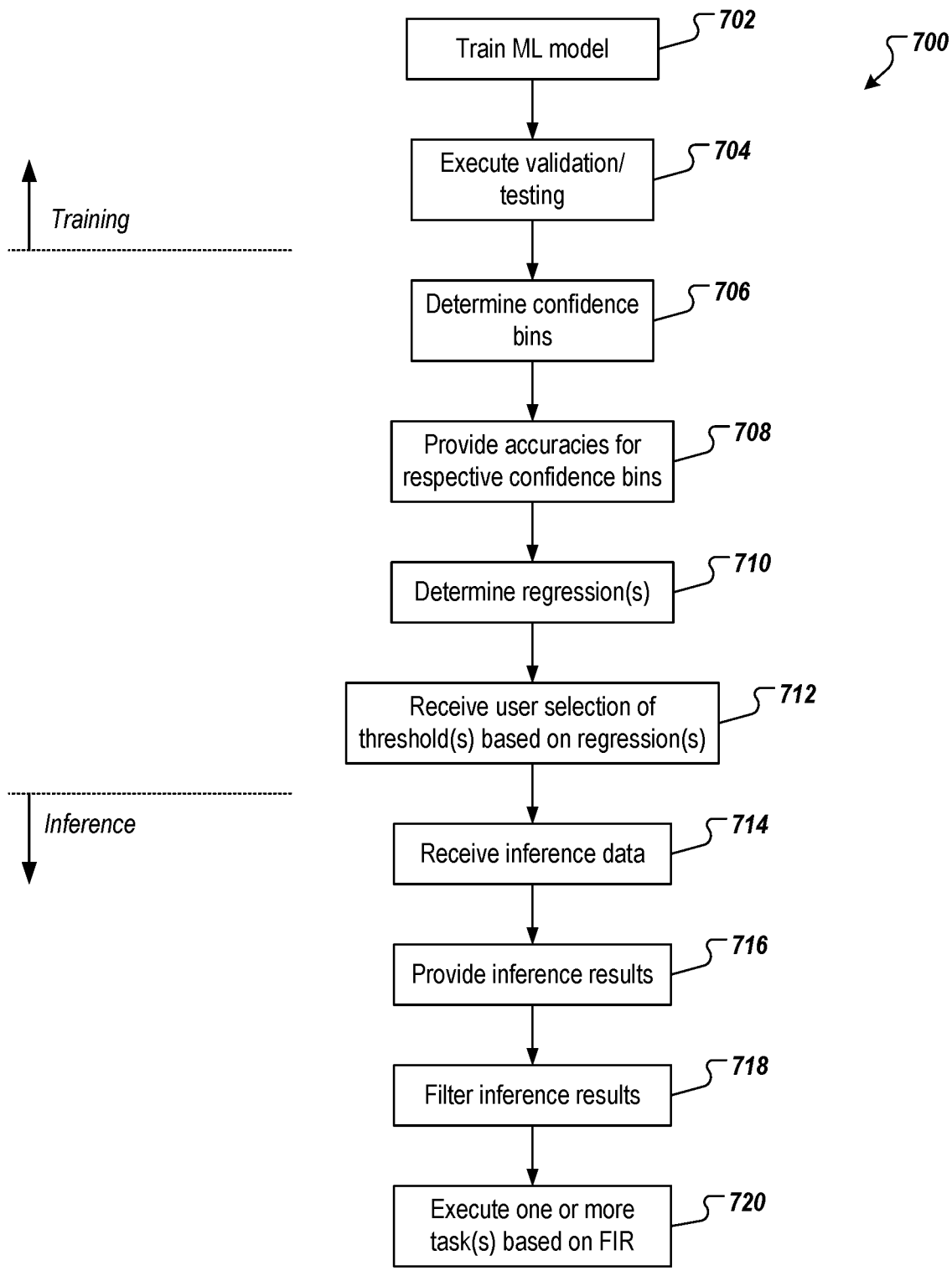
FIG. 7 depicts an example process that can be executed in accordance with implementations of the present disclosure.

FIG. 7 depicts an example process 700 that can be executed in accordance with implementations of the present disclosure. In some examples, the example process 700 is provided using one or more computer-executable programs executed by one or more computing devices.

A ML model is trained (702). For example, and as described herein, in a training phase, the ML model is trained on training data in the training sub-set. The ML model is iteratively trained, where, during an iteration, also referred to as epoch, one or more parameters of the ML model are adjusted, and an output is generated based on the training data (e.g., class predictions). Validation and testing of the (trained) ML model are executed (704). For example, and as described herein, in a validation phase, the (trained) ML model is evaluated using the validation sub-set. For example, the known inputs can be processed through the ML model to generate respective predictions, and the predictions can be compared to the respective known outputs of the validation sub-set to validate the ML model. In general, the validation phase provides an unbiased evaluation of a fit of the ML model on the training sub-set. In some examples, one or more hyperparameters (e.g., high-level hyperparameters) of the ML model can be adjusted during the validation phase. In a testing phase, the (trained and validated) ML model is tested based on the test sub-set and an accuracy of the ML model can be determined.

Confidence bins are determined (706). For example, and as described herein, a confidence step can be determined based on a distribution of the confidence values. An accuracy is provided for each confidence bin (708). For example, and as described herein, an accuracy is determined based on a number of correct predictions within a confidence bin and a total number of predictions within the confidence bin. In some examples, for each confidence bin, multiple accuracies are determined (e.g., single, multi). One or more regressions are determined (710). For example, and as described herein, a regression model (e.g., polynomial, isotonic) is applied to the accuracy and confidence bins to provide one or more regressions (e.g., a single match regression, a multi-match regression).

Selection of one or more thresholds is received (712). For example, and as described herein, a user (e.g., an agent of an enterprise) provides use input to a GUI, the user input indicating selection of one or more confidence thresholds (e.g., single match proposal, single match auto-clear, multi-match proposal, multi-match auto-clear). Inference data is received (714). For example, and as described herein, an enterprise submits inference data (e.g., bank statement table, invoice table) to an inference server. Inference results are provided (716). For example, and as described herein, the inference server processes the inference data through the ML model, which provides inference results (e.g., predicted matches between bank statement records and invoices).

Inference results are filtered (718). For example, and as described herein, the inference results having respective confidences lower than a respective threshold confidence (e.g., single match proposal, single match auto-clear, multi-match proposal, multi-match auto-clear) are filtered from the inference results to provide filtered inference results. That is, for example, the filtered inference results include inference results having respective confidences that meet or exceed respective confidence thresholds. One or more tasks are executed based on the FIR (720). For example, and as described herein, one or more tasks can be automatically executed (e.g., auto-clear) in response to one or more inference results in the filtered inference results.

Figure 8:
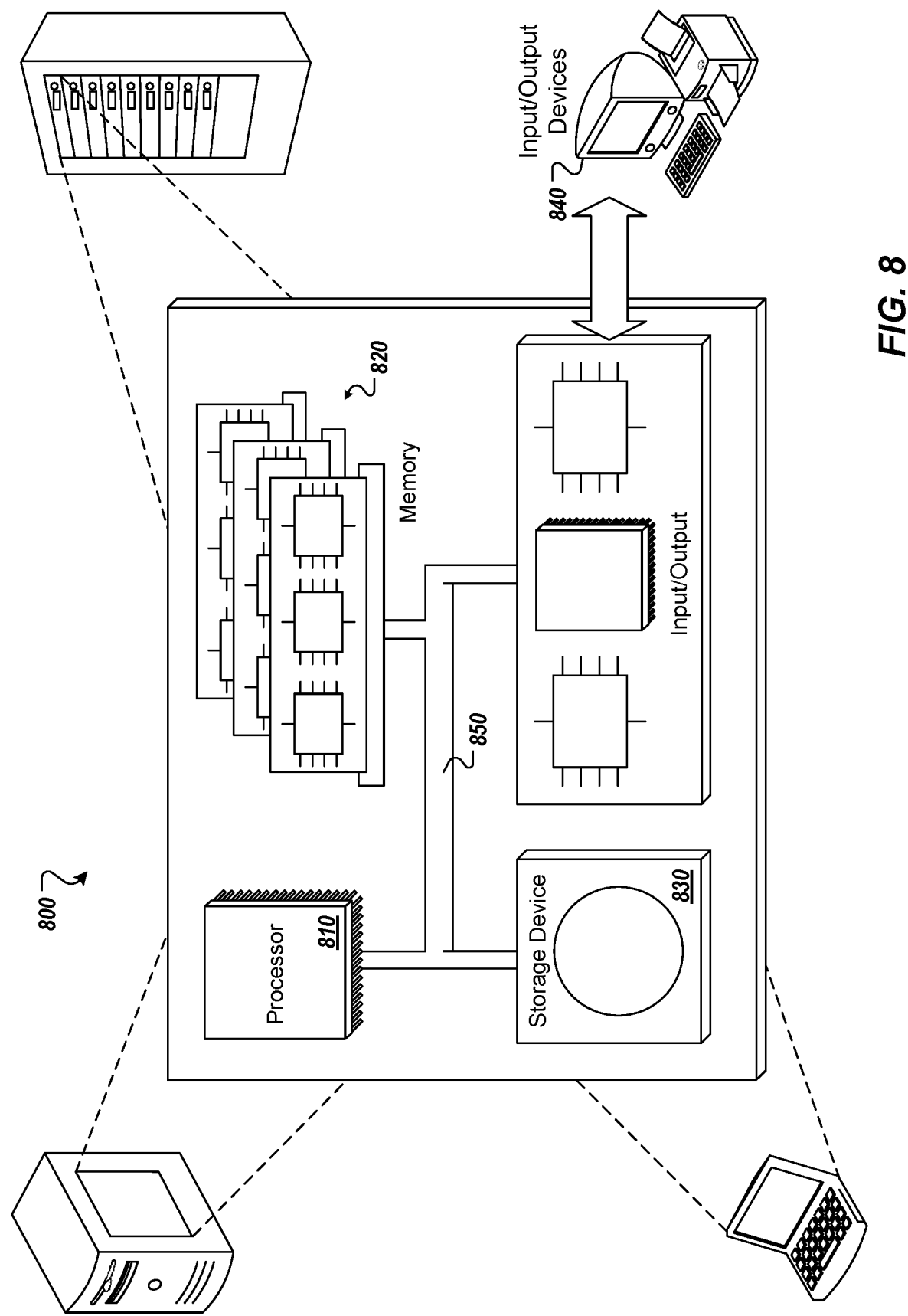
FIG. 8 is a schematic illustration of example computer systems that can be used to execute implementations of the present disclosure.

Referring now to FIG. 8, a schematic diagram of an example computing system 800 is provided. The system 800 can be used for the operations described in association with the implementations described herein. For example, the system 800 may be included in any or all of the server components discussed herein. The system 800 includes a processor 810, a memory 820, a storage device 830, and an input/output device 840. The components 810, 820, 830, 840 are interconnected using a system bus 850. The processor 810 is capable of processing instructions for execution within the system 800. In some implementations, the processor 810 is a single-threaded processor. In some implementations, the processor 810 is a multi-threaded processor. The processor 810 is capable of processing instructions stored in the memory 820 or on the storage device 830 to display graphical information for a user interface on the input/output device 840.

The memory 820 stores information within the system 800. In some implementations, the memory 820 is a computer-readable medium. In some implementations, the memory 820 is a volatile memory unit. In some implementations, the memory 820 is a non-volatile memory unit. The storage device 830 is capable of providing mass storage for the system 800. In some implementations, the storage device 830 is a computer-readable medium. In some implementations, the storage device 830 may be a floppy disk device, a hard disk device, an optical disk device, or a tape device. The input/output device 840 provides input/output operations for the system 800. In some implementations, the input/output device 840 includes a keyboard and/or pointing device. In some implementations, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for matching entities using a machine learning (ML) model, the method being executed by one or more processors and comprising:
    executing a ML model through a training pipeline to train the ML model, the ML model generating a first set of predictions, each prediction in the first set of predictions being associated with a confidence;
    determining a set of confidence bins based on confidences of the first set of predictions, each confidence bin defining a respective range of confidence values;
    for each confidence bin in the set of confidence bins, providing an accuracy;
    processing the set of confidence bins and accuracies through a regression model to provide one or more regressions, each regression representing a confidence-to-accuracy relationship;
    defining a set of confidence thresholds based on at least one regression of the one or more regressions; and
    during an inference phase:
        executing the ML model to generate a second set of predictions,
        applying the set of confidence thresholds to selectively filter predictions from the second set of predictions generated by the ML model,
        automatically executing, by a computing device, a first task responsive to a first prediction and a first auto-task threshold, and
        displaying a second prediction to a user in response to a second proposal threshold.

2. The method of claim 1, wherein the regression model comprises one of a polynomial regression model and an isotonic regression model.

3. The method of claim 1, wherein each accuracy is determined as a ratio of a number of correct predictions within a confidence bin and a total number of predictions within the confidence bin.

4. The method of claim 1, wherein determining a set of confidence bins comprises selecting a confidence step based on a distribution of the confidences, wherein each confidence bin comprises a confidence and the confidence step.

5. The method of claim 1, wherein the set of confidence thresholds comprises a first sub-set of confidence thresholds associated with single match and a second sub-set of confidence thresholds associated with multi-match.

6. The method of claim 5, wherein the first sub-set of confidence thresholds comprises a first proposal threshold and the first auto-task threshold, and the second sub-set of comprises the second proposal threshold and a second auto-task threshold.

7. The method of claim 1, further comprising automatically executing third task in response to a prediction in the second set of predictions.

8. A non-transitory computer-readable storage medium coupled to one or more processors and having instructions stored thereon which, when executed by the one or more processors, cause the one or more processors to perform operations for matching entities using a machine learning (ML) model, the operations comprising:
    executing a ML model through a training pipeline to train the ML model, the ML model generating a first set of predictions, each prediction in the first set of predictions being associated with a confidence;

determining a set of confidence bins based on confidences of the first set of predictions, each confidence bin defining a respective range of confidence values;

for each confidence bin in the set of confidence bins, providing an accuracy;

processing the set of confidence bins and accuracies through a regression model to provide one or more regressions, each regression representing a confidence-to-accuracy relationship;

defining a set of confidence thresholds based on at least one regression of the one or more regressions; and during an inference phase:
  executing the ML model to generate a second set of predictions,
  applying the set of confidence thresholds to selectively filter predictions from the second set of predictions generated by the ML model,
  automatically executing, by a computing device, a first task responsive to a first prediction and a first auto-task threshold, and
  displaying a second prediction to a user in response to a second proposal threshold.

9. The non-transitory computer-readable storage medium of claim 8, wherein the regression model comprises one of a polynomial regression model and an isotonic regression model.

10. The non-transitory computer-readable storage medium of claim 8, wherein each accuracy is determined as a ratio of a number of correct predictions within a confidence bin and a total number of predictions within the confidence bin.

11. The non-transitory computer-readable storage medium of claim 8, wherein determining a set of confidence bins comprises selecting a confidence step based on a distribution of the confidences, wherein each confidence bin comprises a confidence and the confidence step.

12. The non-transitory computer-readable storage medium of claim 8, wherein the set of confidence thresholds comprises a first sub-set of confidence thresholds associated with single match and a second sub-set of confidence thresholds associated with multi-match.

13. The non-transitory computer-readable storage medium of claim 12, wherein the first sub-set of confidence thresholds comprises a first proposal threshold and the first auto-task threshold, and the second sub-set of comprises the second proposal threshold and a second auto-task threshold.

14. The non-transitory computer-readable storage medium of claim 8, wherein operations further comprise automatically executing third task in response to a prediction in the second set of predictions.

15. A system, comprising:
a computing device; and
a computer-readable storage device coupled to the computing device and having instructions stored thereon which, when executed by the computing device, cause the computing device to perform operations for matching entities using a machine learning (ML) model, the operations comprising:
  executing a ML model through a training pipeline to train the ML model, the ML model generating a first set of predictions, each prediction in the first set of predictions being associated with a confidence;
  determining a set of confidence bins based on confidences of the first set of predictions, each confidence bin defining a respective range of confidence values;
  for each confidence bin in the set of confidence bins, providing an accuracy;
  processing the set of confidence bins and accuracies through a regression model to provide one or more regressions, each regression representing a confidence-to-accuracy relationship;
  defining a set of confidence thresholds based on at least one regression of the one or more regressions; and
  during an inference phase:
    executing the ML model to generate a second set of predictions,
    applying the set of confidence thresholds to selectively filter predictions from the second set of predictions generated by the ML model,
    automatically executing, by a computing device, a first task responsive to a first prediction and a first auto-task threshold, and
    displaying a second prediction to a user in response to a second proposal threshold.

16. The system of claim 15, wherein the regression model comprises one of a polynomial regression model and an isotonic regression model.

17. The system of claim 15, wherein each accuracy is determined as a ratio of a number of correct predictions within a confidence bin and a total number of predictions within the confidence bin.

18. The system of claim 15, wherein determining a set of confidence bins comprises selecting a confidence step based on a distribution of the confidences, wherein each confidence bin comprises a confidence and the confidence step.

19. The system of claim 15, wherein the set of confidence thresholds comprises a first sub-set of confidence thresholds associated with single match and a second sub-set of confidence thresholds associated with multi-match.

20. The system of claim 19, wherein the first sub-set of confidence thresholds comprises a first proposal threshold and the first auto-task threshold, and the second sub-set of comprises the second proposal threshold and a second auto-task threshold.

* * * * *